US007617521B2

(12) United States Patent
Maes

(10) Patent No.: US 7,617,521 B2
(45) Date of Patent: Nov. 10, 2009

(54) CHARGING VIA POLICY ENFORCEMENT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 933 days.

(21) Appl. No.: 11/123,471

(22) Filed: May 5, 2005

(65) Prior Publication Data

US 2006/0117376 A1 Jun. 1, 2006

Related U.S. Application Data

(60) Provisional application No. 60/632,737, filed on Dec. 1, 2004.

(51) Int. Cl.
*H04L 9/00* (2006.01)
*H04L 9/32* (2006.01)

(52) U.S. Cl. .................................................. 726/1; 726/2

(58) Field of Classification Search ................. 726/1–7; 713/168–170; 705/50, 52
See application file for complete search history.

(56) References Cited

U.S. PATENT DOCUMENTS

| | | | | |
|---|---|---|---|---|
| 5,850,517 | A | 12/1998 | Verkler et al. | |
| 6,157,941 | A | 12/2000 | Verkler et al. | |
| 6,374,305 | B1 | 4/2002 | Gupta et al. | |
| 6,990,491 | B2 * | 1/2006 | Dutta et al. | 707/9 |
| 7,092,385 | B2 * | 8/2006 | Gallant et al. | 370/352 |
| 2002/0087674 | A1 | 7/2002 | Guilford et al. | |
| 2002/0178122 | A1 | 11/2002 | Maes | |
| 2002/0184373 | A1 | 12/2002 | Maes | |
| 2002/0194388 | A1 | 12/2002 | Boloker et al. | |
| 2002/0198719 | A1 | 12/2002 | Gergic et al. | |
| 2002/0198991 | A1 | 12/2002 | Gopalakrishnan et al. | |
| 2003/0023953 | A1 | 1/2003 | Lucassen et al. | |
| 2003/0046316 | A1 | 3/2003 | Gergic et al. | |
| 2005/0015340 | A1 | 1/2005 | Maes | |

OTHER PUBLICATIONS

U.S. Appl. No. 11/024,160, filed Dec. 27, 2004.

U.S. Appl. No. 11/070,317, filed Mar. 1, 2005.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Single Sign on Deployment Guide, Introduction to Single-Sign-On, Netscape 6 Documentation Training Manual hhttp://developer.netscape.com/docs/manuals/security/SSO/sso.htm on May 26, 2003, 5 pages.

Liberty Architecture Overview, Liberty Alliance Project Version 1.1, Piscataway New Jersey, Jan. 15, 2003, 44 pages.

(Continued)

*Primary Examiner*—Hosuk Song
(74) *Attorney, Agent, or Firm*—Townsend and Townsend and Crew LLP

(57) ABSTRACT

Methods, systems, and machine-readable mediums are disclosed for charging via policy enforcement. In one embodiment, the method comprises receiving a communication associated with a billable resource and invoking a charging policy to be applied to the communication. The charging policy includes a logical combination of one or more conditions to be satisfied and one or more actions to be executed to enforce the charging policy. The method further comprises receiving a result from the charging policy and validating the charging policy if the result indicates the charging policy completed successfully.

30 Claims, 7 Drawing Sheets

OTHER PUBLICATIONS

Parlay APIs 4.0, Parlay X Web Services White Paper, The Parley Group: Parlay X Working Group, Dec. 16, 2002, 12 pages.

*Policy-Based Management* Tom Sheldon's Linktionary, downloaded http://www.lintionary.com/p/policy.html on Aug. 2, 2004, 4 pages.

Andrews, Tony et al.; Business Process Execution Language for Web Services, Version 1.1.; BEA Systems, International Business Machines Corporation, Microsoft Corporation, SAP AG, Siebel Systems, May 5, 2003, 31 pages.

* cited by examiner

CHARGING VIA POLICY ENFORCEMENT

CROSS-REFERENCES TO RELATED APPLICATIONS

This application claims the benefit of U.S. Provisional Application No. 60/632,737, entitled “Billing Via Policy Enforcement,” filed Dec. 1, 2004, which is incorporated herein by reference.

BACKGROUND OF THE INVENTION

In today’s world, a user has the ability to access a wide range of applications or other types of resources. Some of these resources may be billable resources. A variety of different billing schemes may be used to charge the user for the use or access of the billable resource. For example, a user may be charged per use, by the functions accessed or by an amount of time the billable resource was used. In some cases, the billable resource may use a different billing scheme for different users. Additionally, users may be billed at different rates for the use of the billable resource.

A billable resource may access a billing system during the processing of a user communication to charge the user appropriately. The billing system may be accessed through APIs that may be invoked by the billable resource to generate billing records. The billable resource must generate the appropriate rating, charging, and billing API calls to the billing system. Thus, the API calls to the billing system and other billing logic are mixed within the logic of the billable resource.

There are also applications in the prior art that implement policies. Policies are used for a variety of purposes. For instances, polices may be used to authorize or authenticate a user, enforce service level agreements, and allocate resources. One example of a policy management system is the IETF policy management architecture. The IETF architecture includes a policy management service for administering policies and policy enforcement points that enforce policies based on the policy rules. Other exemplary environments that use policies include web service activities (e.g., choreography of events, security), Web-Services-Policy (WS-Policy), Object Management Architecture (OMA) activities, and Third Generation Partnership Project (3GPP). In the prior art, policies are implemented as rules having a condition that must be satisfied at the time the condition is evaluated for an action to be executed.

BRIEF SUMMARY OF THE INVENTION

Methods, systems, and machine-readable mediums are disclosed for charging via policy enforcement. In some embodiments, the method comprises receiving a communication associated with a billable resource. By way of example, the billable resource may be a messaging system, a software on demand application, or other type of resource charging for provided services. The method further includes invoking a charging policy to be applied to the communication. The charging policy includes a logical combination of one or more conditions to be satisfied and one or more actions to be executed to enforce the charging. In one embodiment, the policy may be a Business Process Express Language (BPEL) object. A result is received from the charging policy and the charging policy is validated if the result indicates the charging policy evaluated successfully.

In some aspects, the communication may comprise a service request for the billable resource (e.g., a request for a message to be delivered to a user device, a request to use a software application, etc.). If the charging policy is validated the method may further comprise transmitting the communication to the billable resource. In other aspects, the communication may comprise a communication transmitted by the billable resource. The communication may include a measure of usage associated with a service provided by the billable resource to a requester. Thus, invoking the charging policy may comprise invoking a charging policy to charge the requester in accordance with the measure of usage.

The method may, in some embodiments, further comprise correlating the communication to a charging transaction associated with a requester of the billable resource. In these embodiments, the communication may comprise a request to increase or decrease a billing amount associated with the charging transaction. If the request is to increase the billing amount and the charging policy is not validated, a transaction associated with the requester may be terminated.

In still further aspects, invoking a charging policy may comprise invoking a charging policy to reserve a billing amount for a transaction associated with the billable resource. A result message may be received from the billable resource indicating whether the transaction completed successfully. If the result message indicates the transaction did not complete successfully, the policy or another charging policy may be invoked to reverse the reserved billing amount.

In other embodiments, a method is disclosed which comprises receiving a policy evaluation request to enforce a charging policy on a communication. The policy evaluation request includes a requester identifier. At least one condition for a user account associated with the request identifier is evaluated. If the condition is satisfied, one or more actions are executed to charge the requester for a billable resource service.

A variety of different actions may be executed to charge the requester for the billable resource service. For example, the action(s) may include determining an amount to charge the requester. This amount may be based on a measure of usage, the requester, the resource used, the type of request, or other information.

In some embodiments, executing the action(s) may comprise reserving a billing amount. In these aspects, the method may also comprise receiving a second request to commit the billing amount reservation. A transaction associated with the billing amount reservation is committed. Merely by way of example, the billing amount may be reserved by initiating a database transaction to record the billing amount in an account associated with the account identifier and committing the transaction may comprise committing the database transaction. In some aspects, the second request may include a measure of usage. Before the billing amount reservation is committed, the method may further comprise adjusting the billing amount reservation in accordance with the measure of usage. In alternative or additional embodiments, the method may include receiving a request to increase the billing amount reservation. The charging policy may be evaluated for the increased billing amount.

In other embodiments, a system that may be used to charge via policy enforcement is disclosed. The system includes a communications interface to receive a communication associated with a billable resource. The system also includes logic to invoke a charging policy to be applied to the communication. The logic is further configured to determine whether the charging policy completed successfully.

The communications interface may be further configured to transmit the communication to the billable resource if the charging policy completed successfully and/or to transmit a request denial if the charging policy completed unsuccessfully. In some aspects, the system may further comprise the billable resource (e.g., a messaging system). In other aspects, the system may further comprise the charging policy (e.g., a Business Process Execution Language policy object).

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
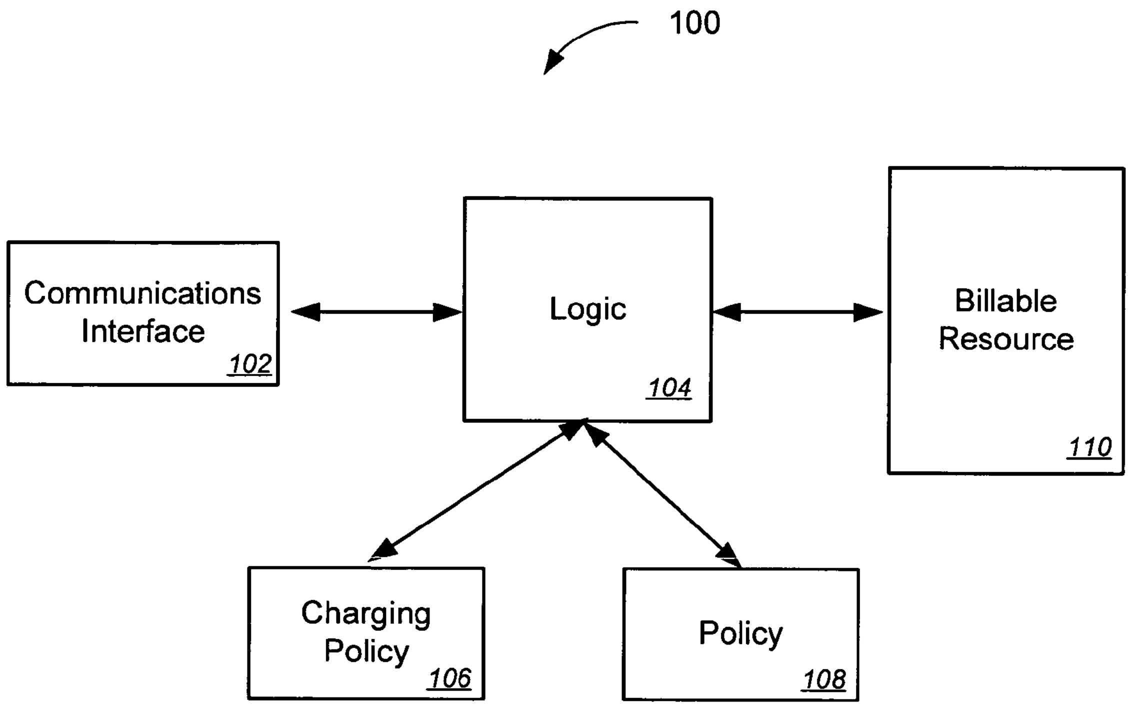
FIG. 1 illustrates an exemplary embodiment of a system that may be used to charge for the use of a billable resource using policy enforcement.

FIG. 1 illustrates an exemplary embodiment of a system that may be used to charge for the use of a billable resource by using policy enforcement. The system 100 includes a communications interface 102. By way of example, communications interface 102 may be an interface that may be used to send and receive Internet communications, such as web services communications (e.g., SOAP messages). Communication interface 102 may also be used to receive other types of communications to which policies are applied. In some embodiments, communication interface 102 may be used to intercept requests sent to billable resource 110.

Policy system 100 further includes logic 104 communicatively coupled with communications interface 102. Logic 104 may be one or more software programs, one or more components of a software program (e.g., function or program object), firmware, or other type of machine-executable instructions that may be used to process communications received from communications interface 102. In one embodiment, logic 104 may include a workflow engine using Business Process Execution Language (BPEL).

Logic 104 is also communicatively coupled with a one or more policies 106, 108. A policy 106, 108 may be a logical combination of conditions to be satisfied and actions to be executed. Policies 106, 108 may be programs, program components, or other type of machine-executable instructions. In one embodiment, policies 106, 108 may be program objects, such as BPEL objects. As will be described in further detail below, during the processing of a communication received on communications interface 102, logic 104 may execute a workflow to determine that one or more policies 106, 108 are to be applied to the communication. One of the policies that logic 104 may be a charging policy 106 that may be used to charge a user for the use of a billable resource 110. As another example, authorization policies and/or a prioritization policies may be applied to a communication requesting access or use of billable resource 110. Logic 104 may enforce policies 106, 108 on a communication by invoking the appropriate policy. Thus, logic 104 may be a gateway for communications destined to the billable resource 110.

The system 100 further includes a billable resource 110, which is communicatively coupled with logic 104. Billable resource 110 may be any type of resource, such as an application or function, which charges for use or access of the resource. In one embodiment, billable resource 110 may be a message delivery system, such as that described below in FIG. 3. In another embodiment, billable resource 110 may be a software on demand application which charges for the use of a software application. As previously described, in some embodiments, logic 104 may be used to manage communications received for the billable resource 110. Thus, logic 104 may act as a gateway or a proxy which receives, intercepts, or otherwise monitors communications to the billable resource 110. In other aspects, the billable resource 110 may invoke charging policies 106 and/or other policies 108.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that communications interface 102, logic 104, policies 106, 108, and billable resource 110 may reside on the same or different physical devices and may be components of one or more program applications. It should be also appreciated that the system 100 may contain additional or fewer components that that described in FIG. 1.

It should also be appreciated that in some instances logic 104 may also be used to provide additional services to billable resource 110 and/or clients using billable resource. For instances, logic may provide an interface to a client or the billable resource 110 for monitoring billing accounts or usage. Another type of interface may be provided for a client to provision their account or for a client or billable resource 110 to establish service level agreements. Other types of interfaces or functionality may be provided to billable resource 110 or clients using the billable resource.

Figure 2:
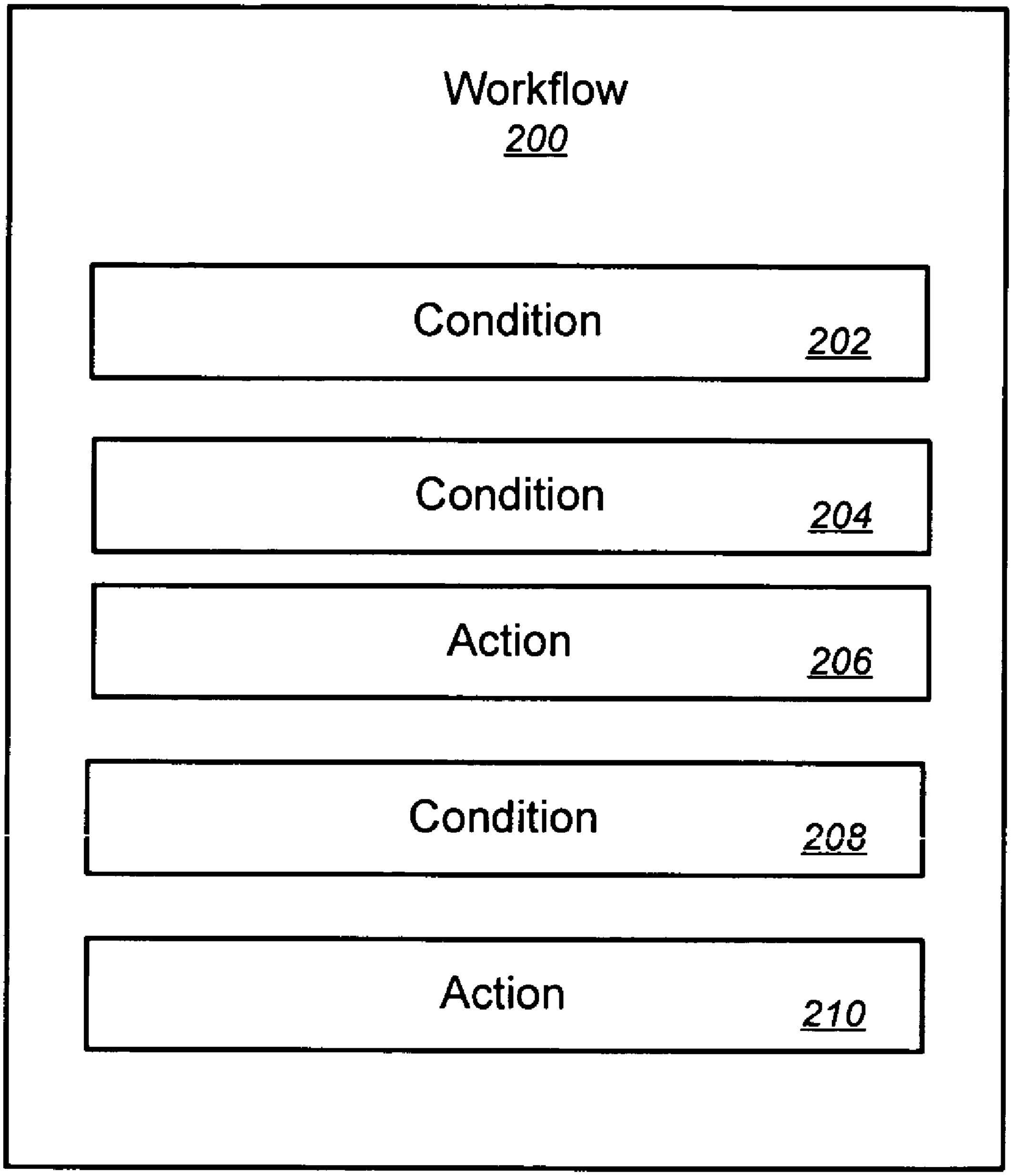
FIG. 2 illustrate an exemplary embodiment of a workflow.

FIG. 2 illustrates an exemplary embodiment of a workflow 200 that may be used by a policy enforcement system to enforce policies, including billing policies. Workflow 200 includes a plurality of conditions 202, 204, 208 to be satisfied for one or more policies to be validated. In some cases the evaluation of conditions 202, 204, 208 may determine which policies to be applied. Additionally, workflow 200 also includes a plurality of actions 206, 210 to be executed for one or more policies to be validated. In some instances, there may be actions that will only be executed if a condition is not satisfied. One or more conditions 202, 204, 208 may depend on results of past actions 206, 210. Workflow 200 may delegate execution of actions and/or evaluation of conditions to other processes. Thus, in some embodiments, an action 206, 210 may be an invocation call to a policy, such as a charging policy, that itself may evaluation conditions and perform actions to enforce policies.

The conditions 202, 204, 208 may be logically combined with the actions 206, 210 in a variety of different ways. For instance, workflow 200 may specify that conditions 202, 204 must be satisfied and action 206 must be executed for a policy to be validated, or that condition 208 must be satisfied and action 210 must be executed for the policy to be validated. If neither combination is successful, then the policy may fail validation. Conditions 202, 204, 208 and actions 206, 210 may also be combined differently. Workflow 200 may also include fewer or additional conditions and actions than that shown in FIG. 2.

It should be appreciated that workflow 200 may provide a much more flexible approach to policy implementation than prior solutions. In the prior art, policies are implemented as conditions that must be satisfied when evaluated. Thus, if the policy condition is not satisfied, the policy is not applied. In contrast, by using a workflow 200, policies may be enforced using any logical combination of conditions and actions. By defining policies as a workflow, policy enforcement may be more dynamic than previous techniques have allowed. For instance, workflow 200 may specify that an action 206 be performed before a condition 208 is evaluated for satisfaction. As another example, workflow 200 may specify optional actions that are to be executed only in the event a condition is or is not satisfied. The conditions may also be based on the result of previous evaluations and/or actions performed.

As previously described, workflow 200 may delegate execution of actions and/or evaluation of conditions to other processes to perform policy enforcement (e.g., a program object, such as a BPEL object or web service). The delegated processes may have both a public and a private interface. The public interface may define parameters that may be passed to the process to be used during the policy evaluation. For instance, an authentication policy may require a security token parameter. The public interface may also include public functions of a policy. The policy may also include a private interface. Thus, in some embodiments, the process may be a "black box" policy, in which the conditions that are evaluated for satisfaction and the actions executed are in a private interface and not know to the workflow logic performing policy enforcement.

Figure 3:
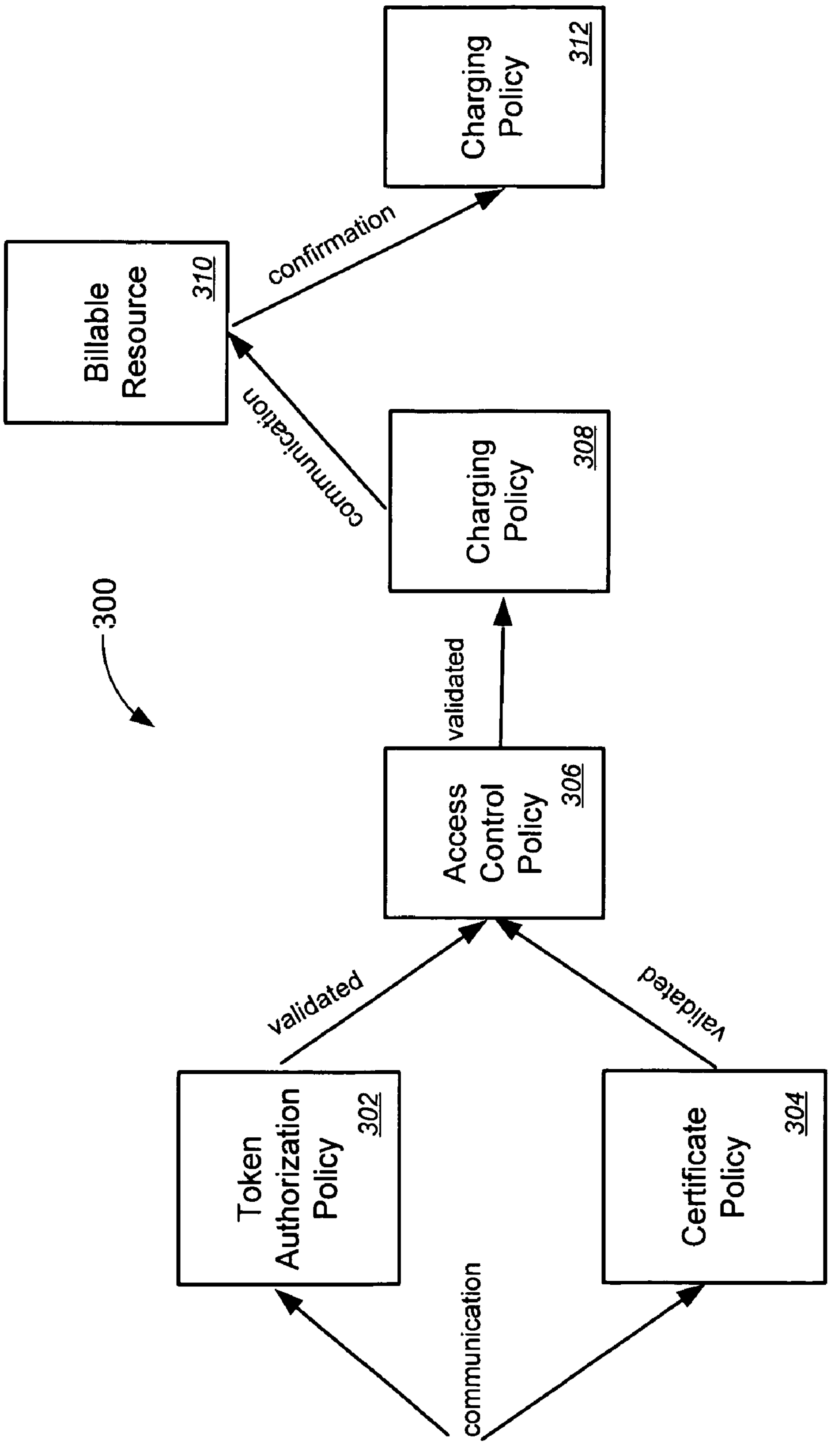
FIG. 3 illustrates enforcement of policies on a communication.

FIG. 3 illustrates an exemplary flow diagram of enforcing policies on a communication. A communication, such as a web services message (e.g., a SOAP message) is received. The communication may be received or intercepted from a client requesting access to a billable resource. A workflow engine, script interpreter, or other type of logic in an execution environment, enforces a variety of different types of policies 302, 304, 206, 308, 312 on the communication by invoking the policies. For instance, a BPEL workflow engine may be used to invoke policies as part of a commands in an execution flow or sequence.

As shown in FIG. 3, the logic responsible for processing the communication (e.g., a workflow engine at a gateway or proxy to a billable resource) may first invoke a token authorization policy 302 and a certificate policy 304 to authenticate the requester. Appropriate parameters may be passed to the policy by the logic as part of the invocation. For instance, the token policy may be passed a token as a parameter. The authentication policies 302, 304 may then each evaluate one or more conditions and/or execute one or more actions to authenticate the user. An indication may then be returned to the logic by each of the policies 302, 304 whether the respective policy 302, 304 evaluation (execution) completed successfully. As illustrated in FIG. 3, the token authorization policy 302 and the certificate policy 304 may at least partially execute simultaneously. By way of example, the policies 302, 304 may be invoked as part of a BPEL flow.

If both of the authentication policies complete successfully, the policies are validated. Additional policies 306, 308, 312 may then be applied to the communication. For example an access control policy 306 may be invoked to authorize the requester to access a service provided by billable resource. If the authorization policy completes successfully, it is validated. A charging policy 308 may then be invoked to evaluate conditions and execute actions to charge appropriately for the communication. For example, the charging policy 308 may include conditions and actions to determine the requester is associated with an account in good standing, to determine the rate to apply to the communication request, and/or to reserve a billing amount for the communication. Other conditions and actions may also be included in the charging policy 308.

Upon validation of the charging policy 308, the communication may be passed to the billable resource 310. The billable resource 310 may then process the communication to satisfy the request for access or services. At some point, the billable resource 310 may transmit a communication indicating a transaction service provided to the requester completed successfully. A reserved billing amount may then be committed by charging policy 312. In some cases, before the billing amount is committed, the charging policy 312 may adjust the amount (increase or decrease) in accordance with a measure of usage provided by the billable resource 310.

It should be appreciated that the policies illustrated in FIG. 3 are exemplary in nature. In alternate embodiments, additional, different or fewer policies may be applied to a communication to fulfill the policy requirements for the billable resource 310. As one example of a variation, the charging policy 308 may not be invoked. Instead, charging policies may be applied by charging policy 312 after the billable resource has completed a transaction with a user. In other aspects, charging policy 308 may not make a reservation of a billing amount, but may instead create a final billing record for the communication. In further aspects, billable resource 310 may issue requests (either to policy logic, which applies a charging policy or to a charging policy) to increase the reserved billing amount during the processing of the communication.

In FIG. 3, the policies 302, 304, 306, 308, 310, 312 all executed successfully and were validated. In some embodiments, in the event a policy does not execute successfully, error recovery may be applied. For example, a BPEL fault handler may specify actions that occur if a policy 302, 304, 306, 308 does not execute successfully.

Figure 4:
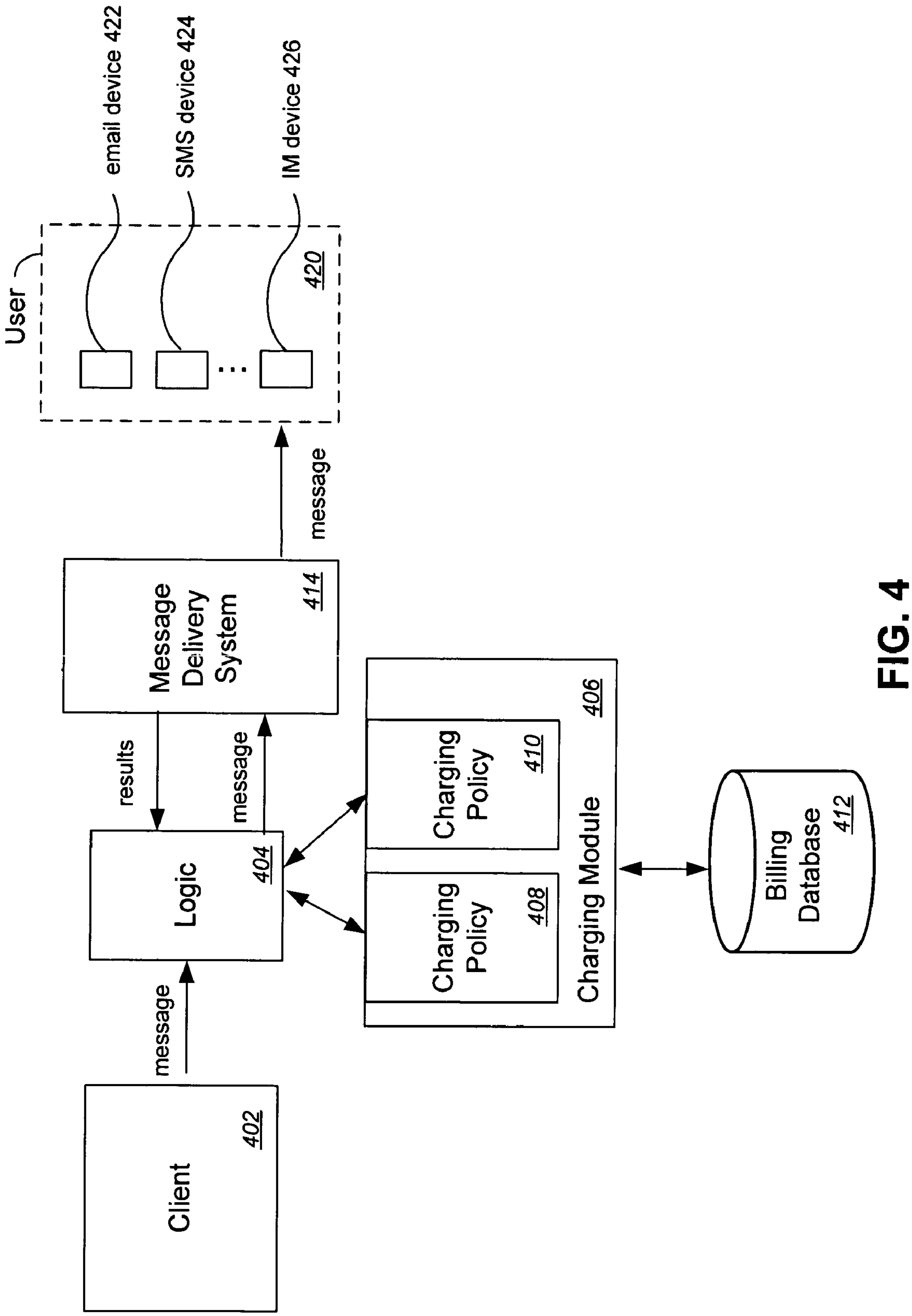
FIG. 4 illustrates an exemplary transmission of a message using a message delivery system, which charges for the message using policy enforcement.

FIG. 4 illustrates an exemplary transmission of a message using a message delivery system, which charges for the message using policy enforcement. A user associated with client 402 may wish to use message delivery system 414 to send a message to a user 420. Client 402 may be any type of device that may use message delivery system 414 to send messages. By way of example, client 402 may be a computing device (e.g., personal computer (PC), personal digital assistant (PDA), pocket PC, etc.) or a mobile device (e.g., cellular phone).

Client 402 may transmit a message for a user 420 to message delivery system 414. In one embodiment, the message may be a web services message (e.g., a SOAP message). Logic 404 may act as a gateway or proxy to message delivery system 414 and may intercept the message transmitted by the client 402. As previously described, logic 404 may then invoke one or more policies to be applied to the communication before it is forwarded to message delivery system 414. The policies invoked by logic 404 may include one or more charging policies 408, 410. These charging policies 408, 410 may be components of a charging module 406.

Charging policies 408, 410 may be communicatively coupled with billing database 412. Billing database 412 may be any type of data storage that may store charging information used for billing (e.g., a relational database, a spreadsheet, internal software lists). In some aspects, billing database 412 may be a component of a billing system. Charging policies 408, 410 may access billing database/billing system 412 to evaluate one or more conditions and/or execute one or more actions to charge client 402 for the message transaction.

In one embodiment, logic 404 may invoke a first charging policy 408 which evaluates one or more conditions to determine if client 402 is associated with an account in good standing and/or has enough pre-paid funds for a message transaction service provided by message system. Charging policy 408 may also evaluate conditions to obtain the rate at which client 402 is to be charged.

In some aspects, charging policy 408 may execute one or more actions to reserve a billing amount for the message transaction. For instance, a record may be created in the billing database 412 indicating the reserved amount; a transaction to create the record may be initiated, but not committed; or another method may be used to reserve a billing amount for the message transaction. The reserved billing may then be committed by a second charging policy 410 (or alternately the same charging policy 408) upon receiving a result message indicating the message delivery completed successfully. Alternately, if the result message indicates the message transmittal failed, the reserved billing amount may be reversed, deleted, or associated with a failed indicator so that client 402 is not charged for the failed message transmittal. The result message may also include other information, such as a message size or other measure of usage (e.g., duration of usage, length of usage). Thus, in some instances, after receipt of the result message, charging policy 408 or 410 may also increase or decrease the reserved billing amount before finalizing the record based on information in the result message. Message delivery system 414 may also request the billing amount be increased during the communication by transmitting a request to logic 404, which may then invoke charging policy 408, 410 or another charging policy to increase the reservation. In other aspects, message delivery system 414 may transmit requests directly to charging policies 408, 410.

It should be appreciated that variations may be made to the interactions between logic 404 and one or more charging policies 408, 410 to enforce charging policies on a message. For example, charging policies may not be invoked until after message delivery system 414 has completed a transaction. The charging policies may then be used to create records used to bill the user associated with client 402 at a later date. Additionally, other types of conditions and actions may alternately or additionally be evaluated and executed by one or more charging policies 408, 410.

Message delivery system 314 may be used to transmit the message to a user 420. In one embodiment, message delivery system 302 may enable communication between devices of various users and may be configured to perform automatic device selection and content conversion of messages. Before sending the message to user 420, message delivery system 414 may determines devices 422, 424, 426 associated with the recipient. For instances, user 420 may be associated with an email device 422, a SMS device 424, an Instant Messaging (IM) device, or other type of device that may be used to receive a message. In some instances, a single device may communicate using multiple communication types. Message delivery system 414 may select one or more of the associated devices 422, 424, 426 based on a variety of criteria, such as the message context and user 420 preferences. Message delivery system 414 may convert the message to a format associated with the selected one or more devices and the message may be forwarded to the selected devices.

As previously described, message delivery system 414 may transmit a result message back to logic 404 so that client 402 may be charged appropriately. Further details of a message delivery system 314 according to one embodiment may be found in application Ser. No. 10/684,686 filed Oct. 13, 2003, entitled "Intelligent Messaging", the details of which are hereby incorporated by reference. In other embodiments, other types of message delivery systems 414 may also charge for message delivery by using policy enforcement.

Other types of billable resources may also charge for use/access of the services provided by the resource using policy enforcement. For instance, the billable resource may be a voice gateway that may be used for voice communications. Logic may invoke charging policy/policies to reserve a billing amount for an initial time period for the communications. The voice gateway may then transmit requests back to logic if additional time is needed and logic may invoke a charging policy to increase the reserved time. Upon completion of the phone call, the voice gateway may transmit a result message back to logic, which may then invoke one or more charging policies to commit the reserved billing amount and in some instances, update the reserved charging amount to charge for the actual amount of time used during the voice communications. As another exemplary embodiment, a software on demand application may use gateway or proxy logic to enforce charging policies on requests for access to a software on demand application.

Figure 5:
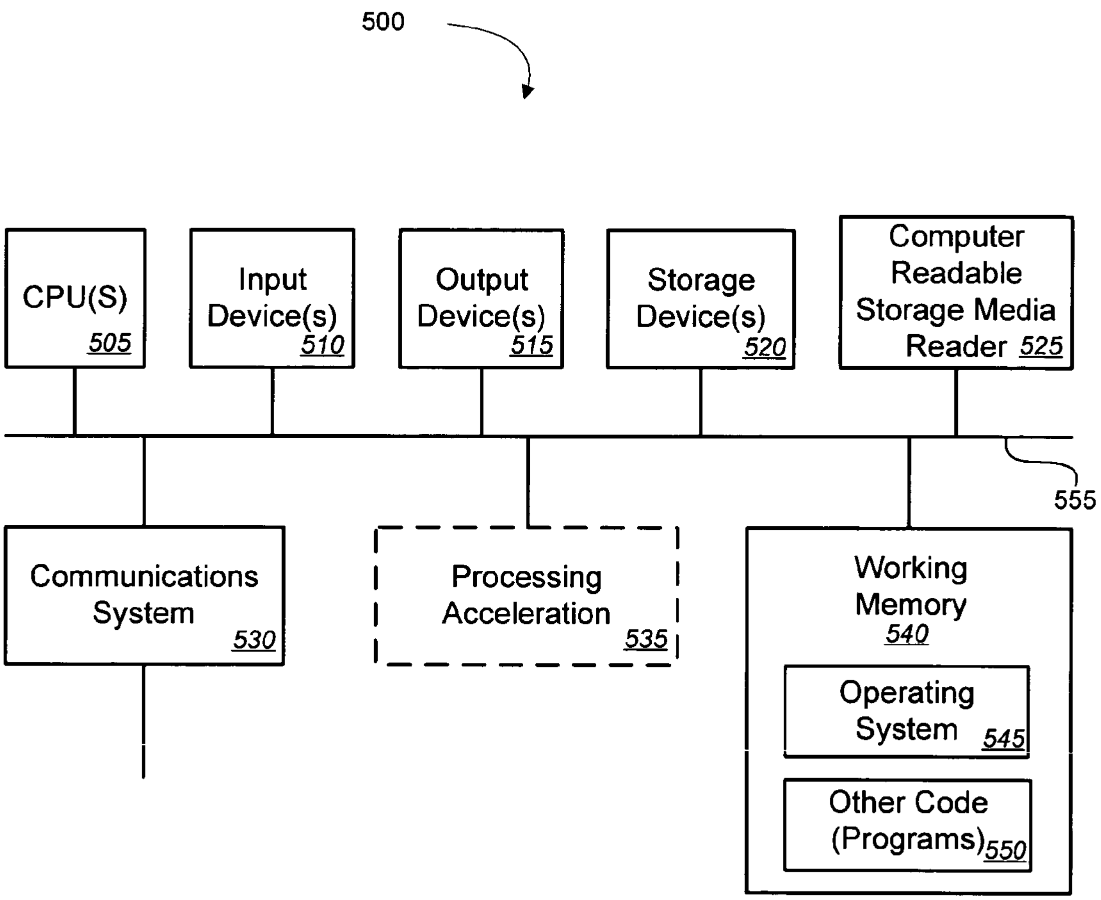
FIG. 5 is a block diagram of an exemplary computer system upon which a charging policy enforcement system may be implemented.

FIG. 5 illustrates one embodiment of a computer system 500 upon which a charging policy enforcement system or components of a billing policy enforcement system may be implemented. The computer system 500 is shown comprising hardware elements that may be electrically coupled via a bus 555. The hardware elements may include one or more central processing units (CPUs) 505; one or more input devices 510 (e.g., a mouse, a keyboard, etc.); and one or more output devices 515 (e.g., a display device, a printer, etc.). The computer system 500 may also include one or more storage device 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 525; a communications system 530 (e.g., a modem, a network card (wireless or wired), an infra-red communication device, etc.); and working memory 540, which may include RAM and ROM devices as described above. In some embodiments, the computer system 500 may also include a processing acceleration unit 535, which can include a DSP, a special-purpose processor and/or the like.

The computer-readable storage media reader 525 can further be connected to a computer-readable storage medium, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with a network and/or any other computer.

The computer system 500 may also comprise software elements, shown as being currently located within a working memory 540, including an operating system 545 and/or other code 550, such as an application program. The application programs may implement a charging policy enforcement system, components of a charging policy enforcement system, and/or the methods of the invention. It should be appreciate that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Figure 6:
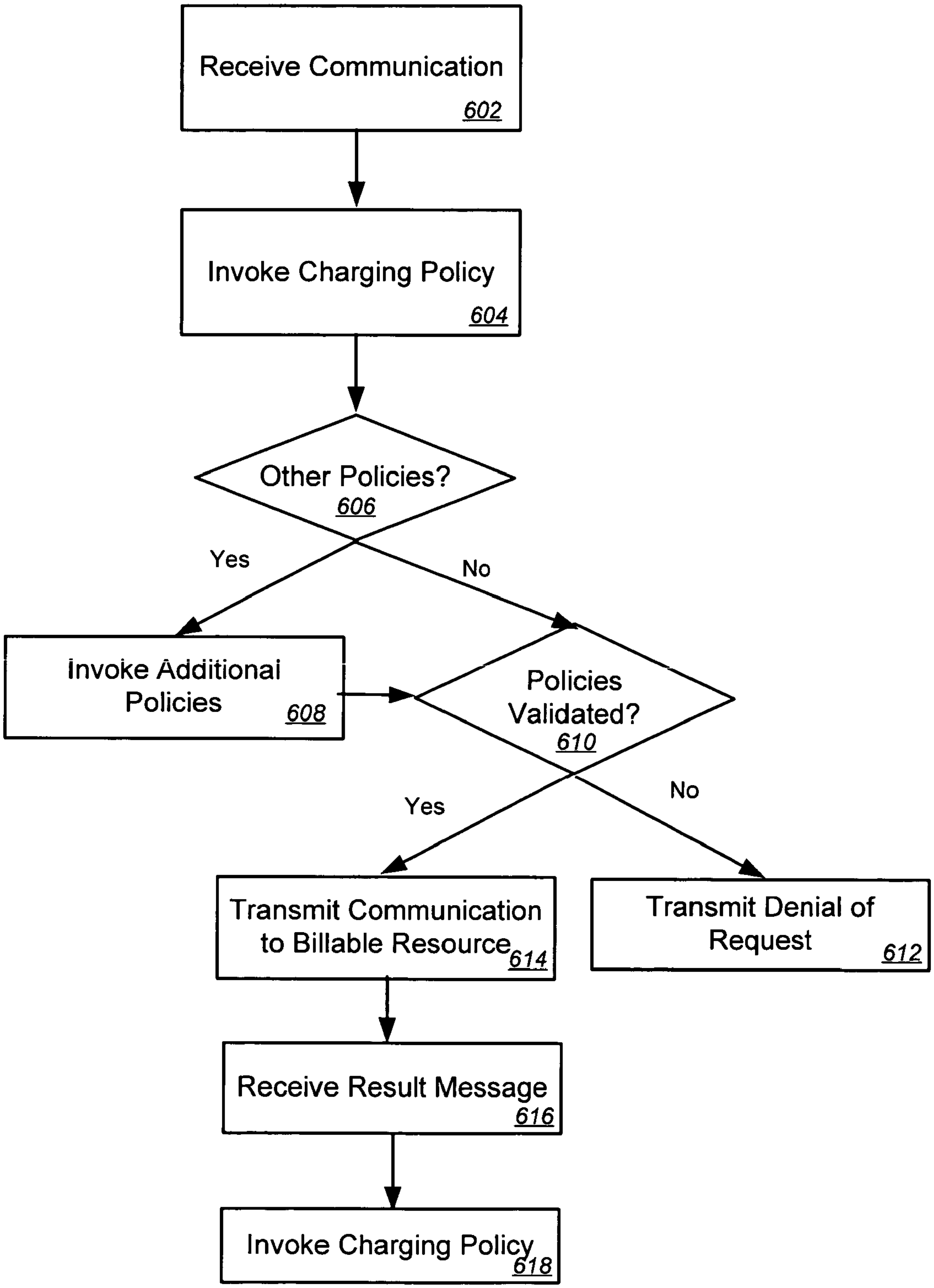
FIG. 6 is a flow diagram of a method for charging via policy enforcement.

FIG. 6 illustrates an exemplary method that may be used to enforce a charging policy on a communication. The method may begin by receiving 602 a communication, such as a SOAP message. The communication may be a request to use a billable resource, a response communication from the billable resource, and/or a communication from the billable resource requesting additional reservation of time, or other type of communication associated with a billable resource.

A charging policy to be applied to the communication is then invoked 604. By way of example, the charging policy may be invoked 604 by making a program call to a function, object, or other program. For instances, the policy may be a BPEL policy which is invoked by executing a statement in the format <invoke policy="policy id">. Parameters may also be specified in the invocation call. The parameters may include a measure of usage associated with the billable resource transaction (e.g., duration of usage, size of usage, length of usage, etc.), a requester identifier, a transaction identifier, a request type, or other information used to evaluate charging conditions.

Other policies 606 may also be enforced against the communication. For example, policies may be applied to authenticate a user or to authorize a user to access a service. These additional policies are also invoked 608. In some embodiments, policies may be invoked simultaneously, such as by execution as part of a BPEL flow. Policies may be invoked sequentially. In some instances, a later sequenced policy may not be invoked if a prior policy did not complete successfully.

The charging policy (and other invoked policies) may return a result indicating whether the policy completed successfully. The result is examined to determine whether the policy is validated 610. If the charging policy completes successfully, it is validated ant the communication may be transmitted 614 to the billable resource (if policy was applied on request) and/or a result of the policy evaluation may be transmitted to the billable resource. If the policy does not complete successfully, a denial of the communication request may be transmitted 612 to the communication initiator or the result may be transmitted to the billable resource (which may then terminate services, transmit a warning to a requester using services, and/or take other appropriate action). In some embodiments, an attempt to recover from a failed validation may be performed first. For instances, program code specified in a fault handler may be executed. By way of example, the program code may perform actions to obtain additional funds from the communication initiator if the charging policy failed because of insufficient funds. Other types of error recovery may also be performed.

It should be appreciated that policies, such as authentication and authorization policies, may be invoked prior to the charging policy 604. If these policies fail to be validated, processing may continue at block 612 prior and charging policy 604 may not be invoked.

In some embodiments, the charging policy invoked 604 may reserve a billing amount for the communication. For instance, if the billable resource is a message system, the billing amount reserved may be based one an expected message size. As another example, if the billable resource is a voice gateway, the billing amount reserved may be based on an initial amount of time for voice communications. The billing amount may remain in a reserved status until a result message (confirmation) is received 616 from the billable resource indicating the billable resource completed the transaction successfully.

The result communication or other communication from billable resource (e.g., request to increase the billing amount) may be correlated to the charging transaction created by the reservation. Merely by way of example, the communication from the billable resource may include a transaction identifier which is matched to a charging transaction identifier. A second charging policy (which may be the same as the first charging policy) may then be invoked 618 to commit the billing amount reserved for the message. In some aspects, the second charging policy may also update the billing amount based on information (e.g., message size, communication time, or other measure of usage) included in the result communication. For instance, if the billing amount was reserved for a message size or amount of time for the communication, the billing amount may be increased or decreased based on the actual size of the message transmitted or the actual length of time for the voice communications. Alternately, if the result communication indicates the transaction failed to complete successfully, the second charging policy may be invoked 618 to reverse the reserved time (i.e., not charge the user for a failed transaction).

It should be appreciated that in alternate embodiments, the method may be performed differently than illustrated in FIG. 6. For instances, in some embodiments, the first charging policy invoked 604 may commit the billing amount, instead of reserving the amount, so a second charging policy may not be invoked 618 to commit the billing amount. In these embodiments, the charging policy may be invoked 604 on a request for services provided by billable resource and/or a response communication or other communication from billable resource. In some cases, the charging policy may be invoked to create charge records used to bill a user of billable resources at a later time. In other aspects, a result communication may not be received 616 from the billable resource.

As another example, the method may further include receiving a request from the billable resource to increase the billing amount. A charging policy may then be invoked to increase the billing amount. The result of the charging policy execution may then be transmitted back to the billable resource, which may either continue processing or terminate services depending upon the result of the charging policy execution. Other modifications may also be made to the method.

As previously described, a charging policy may be invoked by logic enforcing the charging policy on a communication associated with a billable resource. The policy invocation may initiate evaluation (execution) of the billing policy. The billing policy evaluation request (invocation) may include parameters used to evaluate the billing policy. The parameters may include a requester identifier, a requested service, an expected communication length of time, an expected message size, another measure of usage, or other information particular to the billing requirements for the billable resource. By way of example, in embodiments in which the billable resource is a message system and the communication is a message for a user device, the parameters passed to the charging policy may include a communication context for the message. The charging policy may use the information to determine a rate to be applied to the communication, estimate usage of the communication, determine if a user account has sufficient funds and/or is in good standing, or evaluate other conditions or execute actions to charge for billable resource.

Figure 7:
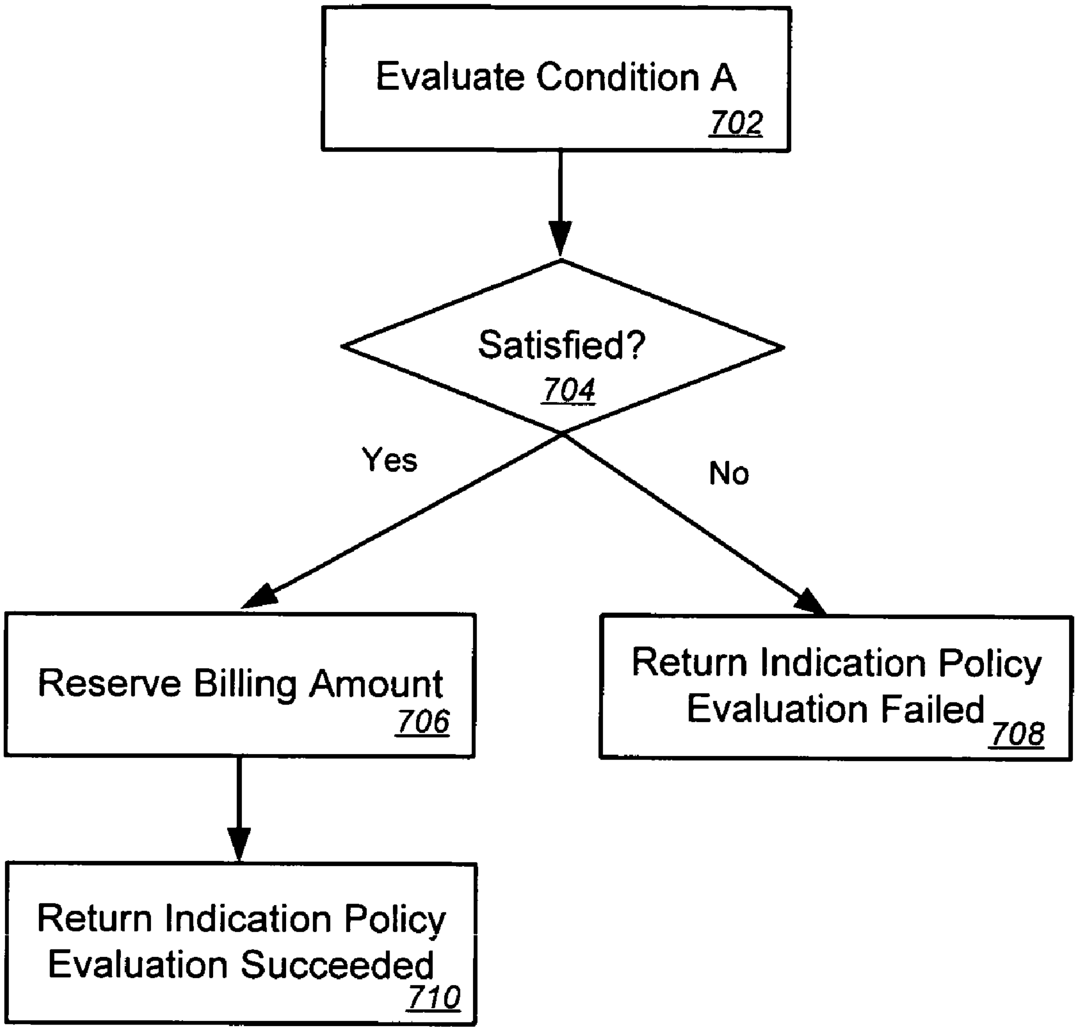
FIG. 7 is a flow diagram illustrating an exemplary method of executing a policy.

FIG. 7 illustrates an exemplary method that may be used during execution (evaluation) of a charging policy. The charging policy execution may begin by evaluating 602 a condition to be satisfied for the policy to be validated (condition A). By way of example, condition A may be a condition that the requester be associated with a user account in good standing and/or the user account has sufficient funds for a transaction. If condition A is not satisfied, an indication may be returned 708 that the policy evaluation failed. Alternately, actions may be performed to attempt to load funds into a user account or other actions that may result in condition A being satisfied. After the actions are performed, condition A may be re-evaluated. At some point, if condition A is still not satisfied, an indication will be returned 708 that the policy evaluation failed.

If condition A is satisfied 604, actions may be executed to reserve 706 (or in some embodiments record without reservation) a billing amount for the communication. An indication may then be returned 710 that the policy evaluation completed successfully. In alternate embodiments, the actions to reserve 706 or record the billing amount may not execute successfully. In these embodiments, an indication may be returned that the policy evaluation failed 708. As previously described, before returning a failure indication, other actions may first be executed to attempt to recover from failed condition evaluation or action execution.

It should be appreciated that FIG. 7 illustrates a simplified example of a charging policy execution. In alternate embodiments, the charging policy may include different or additional combinations of conditions to be satisfied and actions to be executed for the charging policy to be validated (e.g., conditions/actions to determine a rate, to estimate usage of resource, to reverse reserved billing amounts, etc.). If all of the conditions to be evaluated are satisfied and all actions to be executed execute successfully, the charging policy may return a success indication. Otherwise, the charging policy execution may return an indication that the policy evaluation failed.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:

receiving a communication associated with a billable resource;

invoking a charging policy to be applied to the communication, the charging policy including a logical combination of one or more conditions to be satisfied and one or more actions to be executed to enforce the charging policy;

receiving a result from the charging policy; and validating the charging policy if the result indicates the charging policy evaluated successfully.

2. The method of claim 1, wherein receiving the communication comprises receiving a service request for the billable resource.

3. The method of claim 2, wherein if the charging policy is validated, the method further comprises transmitting the communication to the billable resource.

4. The method of claim 1, wherein receiving the communication comprises receiving a communication transmitted by the billable resource.

5. The method of claim 4, wherein the communication includes a measure of usage associated with a service provided by the billable resource to a requester, and wherein invoking the charging policy comprises invoking a charging policy to charge the requester in accordance with the measure of usage.

6. The method of claim 1, further comprising correlating the communication to a charging transaction associated with a requester of the billable resource.

7. The method of claim 6, wherein the communication comprises a request to increase a billing amount associated with the charging transaction.

8. The method of claim 7, wherein if the charging policy is not validated, terminating a transaction associated with the requester.

9. The method of claim 6, wherein the communication comprises a request to decrease a billing amount associated with the charging transaction.

10. The method of claim 1, wherein invoking a charging policy comprises invoking a charging policy to reserve a billing amount for a transaction associated with the billable resource.

11. The method of claim 10, further comprising:

receiving, from the billable resource, a result message indicating whether the transaction completed successfully;

if the result message indicates the transaction did not complete successfully, invoking one of the policy and a second charging policy to reverse the reserved billing amount.

12. The method of claim 1, wherein the billable resource is a messaging system, and wherein receiving a communication comprises receiving a message for a user device.

13. The method of claim 1, wherein the billable resource is a software on demand application and the communication is a request to use the software application.

14. A method comprising:

receiving a policy evaluation request to enforce a charging policy on a communication, the policy evaluation request including a requester identifier;

evaluating at least one condition for a user account associated with the requester identifier; and if the condition is satisfied, executing one or more actions to charge the requester for a billable resource service.

15. The method of claim 14, wherein executing the one or more actions comprises determining an amount to charge the requester.

16. The method of claim 14, wherein executing the one or more actions comprises reserving a billing amount.

17. The method of claim 16, further comprising:

receiving a second request to commit the billing amount reservation; and committing a transaction associated with the billing amount reservation.

18. The method of claim 17, wherein the second request includes a measure of usage and wherein the method further comprises before committing the billing amount reservation, adjusting the billing amount reservation in accordance with the measure of usage.

19. The method of claim 17, wherein reserving the charging amount comprises initiating a database transaction to record a charging amount in an account associated with the account identifier and wherein committing the transaction comprises committing the database transaction.

20. The method of claim 16, further comprising:

receiving a request to increase the billing amount reservation; and evaluating the charging policy for the increased billing amount.

21. The method of claim 14, wherein the communication includes a measure of usage and wherein executing the one or more actions comprises charging a billing amount based at least in part on the measure of usage.

22. A system comprising:

a network communications module configured to receive a communication associated with a billable resource; and a processor in communication with the network module, the processor configure to invoke a charging policy to be applied to the communication and to determine whether the charging policy evaluated successfully.

23. The system of claim 22, wherein the network communications module is further to transmit the communication to the billable resource if the charging policy completed successfully.

24. The system of claim 22, wherein the network communications module is further to transmit a request denial if the charging policy completed unsuccessfully.

25. The system of claim 22, further comprising the billable resource.

26. The system of claim 22, wherein the billable resource is a messaging system.

27. The system of claim 22, further comprising the charging policy.

28. The system of claim 27, wherein the charging policy is a Business Process Execution Language (BPEL) policy object.

29. At least one machine-readable medium, having stored thereon sequences of instructions, which, when executed by a machine cause the machine to:

receive a communication associated with a billable resource;

invoke a charging policy to be applied to the communication, the charging policy including a logical combination of one or more conditions to be satisfied and one or more actions to be executed to enforce the charging policy;

receive a result from the charging policy; and validate the charging policy if the result indicates the charging policy evaluated successfully.

30. At least one machine-readable medium, having stored thereon sequences of instructions, which, when executed by a machine cause the machine to:

receive a policy evaluation request to enforce a charging policy on a communication, the policy evaluation request including a requester identifier;

evaluate at least one condition for a user account associated with the requester identifier; and if the condition is satisfied, executing one or more actions to charge the requester for a billable resource service.

* * * * *

UNITED STATES PATENT AND TRADEMARK OFFICE

CERTIFICATE OF CORRECTION

PATENT NO. : 7,617,521 B2
APPLICATION NO. : 11/123471
DATED : November 10, 2009
INVENTOR(S) : Stephane H. Maes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Nineteenth Day of October, 2010

David J. Kappos

*Director of the United States Patent and Trademark Office*